Inventor
BERNARD STRONG
By
Holcombe, Witherill Busebois
Attorneys

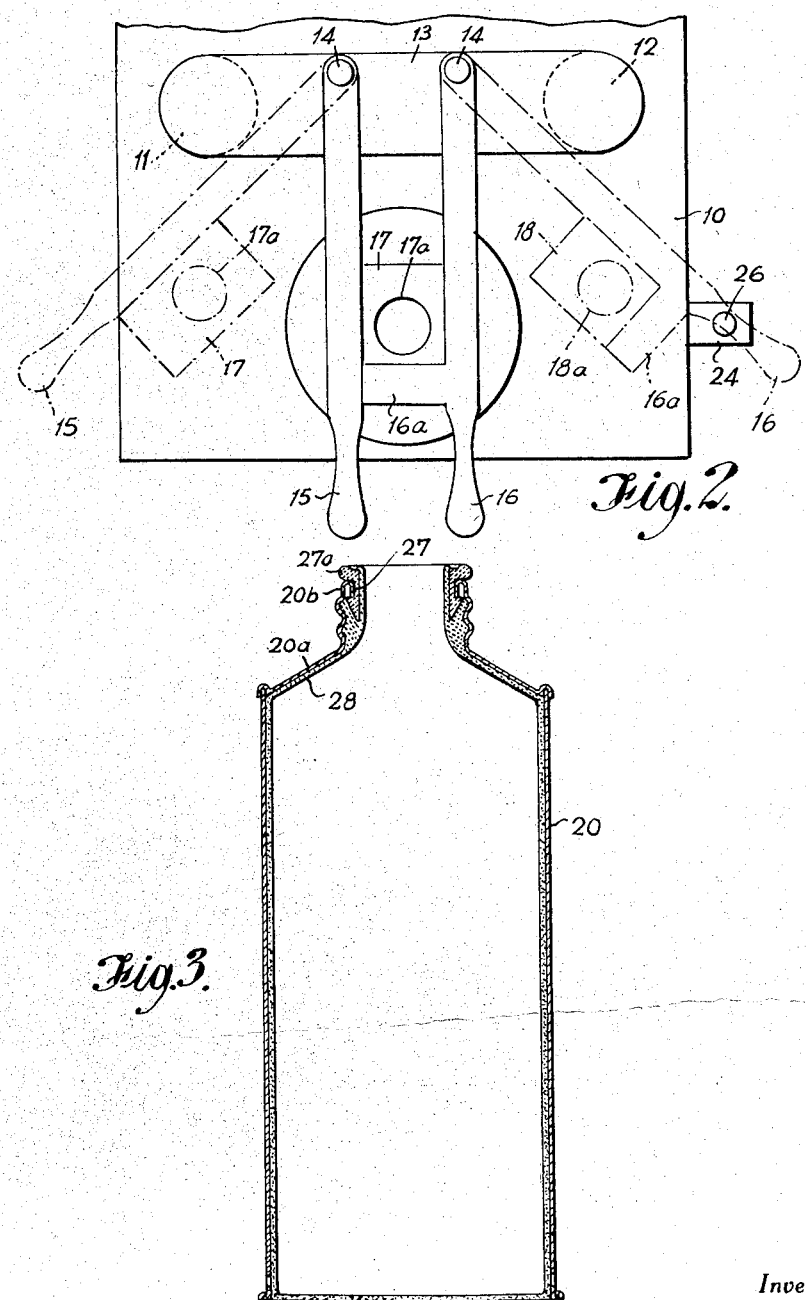

2,898,972

METHOD OF AND APPARATUS FOR THE MANUFACTURE OF LINED CONTAINERS

Bernard Strong, Northwood Hills, England, assignor to E. Shipton & Company Limited, Ferndown, Northwood Hills, England, a British company Application April 5, 1954, Serial No. 420,929

Claims priority, application Great Britain April 10, 1953

7 Claims. (Cl. 154—1)

The present invention relates to an improved lined container, and to a method of and apparatus for the manufacture thereof.

It is often necessary to provide containers, particularly metal containers, with a lining in order to prevent the material of the container from contaminating, or being contaminated or attacked by, the contents thereof. This is normally effected by coating the internal surface of the container with a suitable paint or lacquer. Considerable difficulty is experienced in applying such a coating so that the interior of the container is entirely and evenly covered, and, however extensive the inspection may be, one can never be absolutely certain that the coating is complete and impervious. Furthermore, if the container is dented or is subject to impact, the lacquer is liable to crack or flake off.

According to the present invention, a container is provided with a lining comprising a continuous bag or envelope of a plastic material which has been expanded by blowing to conform with and form a continuous layer over the internal surface of the container. Preferably the bag is made of a thermoplastic synthetic resin material, such as polythene, which is expanded by blowing whilst the thermoplastic material is plastic or semi-plastic, the bag retaining the shape of and being in contact with the internal surface of the container after the material has hardened by cooling.

The continuity of the lining of a container according to this invention can be immediately checked by a simple visual inspection, since if the lining is perforated at all, the bag will not blow up and a visual inspection will show whether or not it has been expanded into contact with the internal surface of the container. Furthermore, provided that the lining is not made of a material which becomes brittle on cooling, the lining will remain as a continuous film even if the container becomes dented.

In order to ensure that the container opening will be adequately protected by the lining, the opening is preferably fitted with a ring of plastic material, preferably of the same material as the bag, before the bag is expanded, so that the bag will be expanded on to and over the internal surface of the ring and become bonded thereto. The ring may be made as an injection moulding and is preferably of such a size, and of necessary provided with an undercut, so that it will snap into the container opening or the end of the neck of the container. The ring may be formed with a flange which overlies the rim of the opening and serves as a sealing washer for the closure cap or the like of the container.

A feature of the invention consists in a method of lining a container with a plastic material, which consists in extruding a length of tubing of the plastic material, closing the open end of the tube, inserting the tube into the container, and, whilst the tube is still in a plastic or semi-plastic condition, admitting a fluid under pressure to the interior of the tube to expand or blow up the same until it conforms with the internal configuration of the container and forms a thin lining over the internal surface thereof. The pressure is maintained until the plastic material has hardened or set sufficiently to remain expanded and in contact with the internal surface of the container.

The method according to the invention is particularly suitable for lining the internal surfaces of metal cans or containers with a layer of polythene. In the preferred method a tube of polythene is extruded through an annular orifice defined by inner and outer tubular members, means being provided for admitting compressed air through the internal tube of the nozzle to expand the extruded length of tubing after the free end of the latter has been closed, either by pinching it by hand or by mechanical means, and the tube has been inserted in the container.

The invention further consists in apparatus for lining containers, comprising a downwardly pointing annular extrusion nozzle, means for extruding a plastic material in a plastic or semi-plastic condition through said nozzle, means for stopping said extrusion, an aperture through the core-piece of said nozzle, means for feeding a compressed fluid to said aperture, means for pinching and severing the plastic tube extruded through said nozzle, said pinching and severing means being arranged below the nozzle and separated therefrom by a predetermined, and preferably adjustable, distance so that when said pinching and severing means is actuated it will cut off the extruded tube to a predetermined length and close the open end thereof, and means for mounting the container below the nozzle with the container neck or opening held in contact with the nozzle or member associated therewith. The pinching and severing means are arranged to be removable or to be movable away from its operative position directly below the nozzle to allow space for the positioning of the container below the nozzle.

The means for stopping the extrusion of the plastic material through the nozzle may be controlled manually or may operate automatically after the desired length of tube has been extruded.

In order that the invention may be more clearly understood, reference will now be made to the accompanying drawings, in which:

Fig. 2 is a plan view of the machine table and the pinching and severing means.

Fig. 3 is a section through a lined can.

Figure 1:
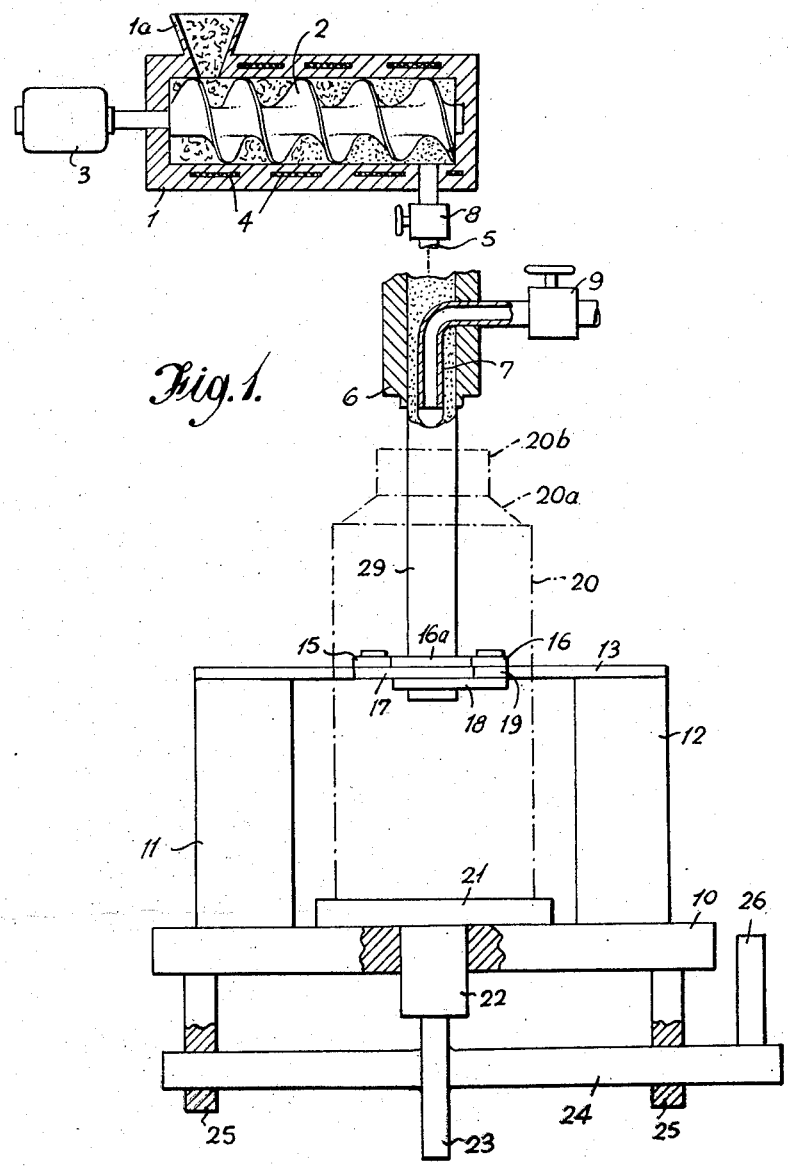
Fig. 1 is a side elevation, partly in section, of part of the machine, namely the extrusion nozzle, machine table, pinching and severing means, and the can support, the remaining parts of the machine only being indicated diagrammatically.

Referring to Figs. 1 and 2 of the drawing, the machine comprises a chamber 1, containing a feed screw 2 driven by a motor 3 and heated by electric heating elements 4, the temperature preferably being thermostatically controlled by means which are not shown. Granular thermo-plastic material, e.g. polythene, is fed to the chamber 1 by the hopper 1a and as it is advanced through the chamber by the feed screw, the plastic material becomes heated and softened so that it is discharged into the conduit 5 in a plastic or semi-plastic condition. The conduit 5 leads to an extrusion nozzle 6 of annular form which is defined by the annular space between inner and outer tubular members 6 and 7 respectively. Extrusion of plastic material through the nozzle 6 may be controlled by the valve 8 in the conduit 5. The valve 8 may be a changeover valve so that the plastic material will be extruded from another nozzle (not shown) when the supply of plastic material to the nozzle 6 is cut off. The inner tube 7 connects with a source of compressed air through a shut-off valve 9.

The nozzle 6 is arranged to face vertically downwards and is directly above the machine table 10, the distance of which below the nozzle may be adjusted by means (not shown) to adapt the machine for lining containers of different sizes. Secured to and extending upwardly from the machine table 10 are two pillars 11 and 12, across the upper ends of which is secured a plate 13. Pivoted by bolts 14 or the like to and resting on the upper surface of the plate 13 are two lever arms 15, 16. Secured to the undersides of these arms are two rectangular plates 17, 18 respectively, the plate 17 being secured directly to the arm 15, and the plate 18 being secured to the arm 16 with the interposition of a spacer strip 19 of the same thickness as the plate 17. Thus when the two arms 15, 16 are moved towards one another, the plates 17 and 18 can overlap, the extent of overlap being limited by a projection 16a on the arm 16 bearing against the arm 15. This projection 16a and the plate 18 together form a channel which receives the plate 17, when the plates are in the overlapping position, whereby the plates 17 and 18 are held close together.

The plates 17 and 18 are provided with apertures 17a, 18a which are aligned with one another, and also lie directly below the nozzle 6, when the plates are fully overlapped. These apertures have a diameter which is greater than that of the plastic tube 29 which is extruded through the nozzle 6. The apertured plates constitute the pinching and severing means for closing and cutting off the tube 29 extruded from the nozzle 6 to the required length for lining a particular container. In use, the plastic tube 29 is extruded until it passes through the aligned apertures 17a, 18a directly therebeneath. The extrusion is then stopped by operating the valve 8, whereafter the levers 15 and 16 are moved apart, the edges of the apertures 17a and 18a pinching the walls of the tube 29 together and cutting off the tube to the predetermined length. The arrangement effects a clean cut and seal without substantially deflecting the depending length of extruded tube from its vertical position. This is important for producing a uniformly thick lining over the container when the closed tube is blown up to form the lining, and assists in ensuring that the closed end of the tube will be blown centrally on to the base of the can.

The levers 15, 16 and the plates 17, 18 are moved apart sufficiently (as shown in the dotted line position in Fig. 2) to allow the container to be fitted around the extruded length of tube and against the nozzle 6. In the drawing, the container is shown as a metal can 20 generally in the form of a vertical cylinder with a frustro-conical top 20a terminating in a neck 20b formed with an external thread for receiving a screw-on cap. The can, after passing the neck over the extruded tube 29, is positioned (as shown in dotted lines in Fig. 1) on the platform 21 resting on the machine table 10 and provided with a spigot 22 passing through an aperture in the table. The lower end of the spigot 22 is adapted to be moved by a cam 23 on a shaft 24 rotatable in bearings 25 depending from the underside of the machine table 10. When the cam lever 26 is actuated the cam 23 raises the spigot 22 and platform 21 to lift the can 20 and urge the top of its neck 20b to seat against the nozzle 6.

Compressed air is then admitted through the central tube 7 by opening the valve 9, and the length of extruded tube 29, which is still in a plastic or semi-plastic condition, is blown up like an expansible bag to form a lining 28 over the entire internal surface of the can, including the bottom and the neck thereof. The can is provided with one or two very small holes in or adjacent its base to allow the air, which would otherwise be trapped between the can and the expanding tube, to escape. Air pressure is maintained until the lining 28 has cooled sufficiently to remain in position. The cam lever 26 is then operated to lower the platform 21 and the can drops or is pulled away from the nozzle, the short length of plastic tube which is pulled from the nozzle being cut-off. The lining at the top of the neck of the can is then trimmed.

The lining may be splayed over the top of the neck, but preferably, as shown in Fig. 3, in order to ensure that the neck of the can will have a clean and protective finish, a preformed ring 27 of polythene, which may be an injection moulding, is fitted into the end of the neck 20b before the lining is blown. The ring 27 is formed with a groove around its outer surface which snaps over the inwardly formed bead at the top of the neck 20b, and also with a flange portion 27a which overlies the end of the neck and forms a sealing washer for the screw cap. The plastic lining, when expanded on to the ring 27, becomes bonded thereto.

Whilst a particular embodiment has been described, it will be understood that various modifications may be made without departing from the scope of the invention.

I claim:

1. Apparatus for lining containers, comprising a downwardly pointing annular extrusion nozzle having a core-piece, means for extruding a plastic material through said nozzle, to form an open-ended tube, means for stopping extrusion through said nozzle, an aperture through the core-piece of said nozzle, means for feeding a compressed fluid through said aperture into the plastic tube extruded through said nozzle, means for pinching and severing said tube, said pinching and severing means being arranged below the nozzle and being separated therefrom by a predetermined distance equal to at least about one half of the height of the container to be lined so that when the pinching and severing means is operated it will cut off the extruded tube to a predetermined length and close the open end thereof, and means for mounting a container below the nozzle with its opening against the nozzle, said pinching and severing means being movable from their operative position to permit said container to be thus mounted.

2. Apparatus as claimed in claim 1, wherein the pinching and severing means comprises two superimposed apertured members so arranged that the apertures therein can be substantially aligned in a position directly below the nozzle, the apertures being larger than the diameter of the plastic tube extruded from the nozzle, and wherein said members are mounted so as to be movable substantially symmetrically to the tube to reduce the overlapping areas of the apertures and thereby cut off the tube to the required length and close the open end thereof.

3. Apparatus as claimed in claim 2, wherein said apertured members comprise plates carried by two levers movable about vertical pivots, said plates having circular apertures therein and the levers being movable from positions in which the plates overlap with their apertures aligned beneath the nozzle to positions in which the plates are moved away from beneath the nozzle to leave space for positioning a container to be lined beneath the nozzle.

4. Apparatus as claimed in claim 3, wherein said levers are carried on a member supported by a machine table supported below the nozzle, the table also comprising a container support and means for moving said container support upwardly to hold the upper end of a container mounted thereon in contact with the nozzle.

5. A method of lining a container having a base and an opening opposite to the base, which comprises providing at least one small vent aperture in the container adjacent its base, extruding a length of open-ended thermoplastic tube through a downwardly facing nozzle, stopping said extrusion, cutting said tube at a predetermined distance from the nozzle, which is shorter than the height of the container but which is not less than about one half the height of the container, pinching the end of the tube to close it, placing the container with its opening under the cut length of tube depending from the nozzle, enclosing said length of tube in the container by relative vertical movement, introducing fluid under pressure into said depending length of tube while the material thereof is still in a semiplastic state to expand the tube into intimate contact with the base and side walls of the container, maintaining said pressure while allowing the expanded tube material to set permanently in such intimate contact, and severing the said material from the nozzle.

6. Method as claimed in claim 5, wherein a preformed ring of plastic material is fitted into the container opening before the tube is expanded, so that expanding the tube will cause the same to also cover and be heat-bonded to the internal surface of the ring.

7. A method of lining a container closed at its base and having an opening opposite to said base, which comprises providing at least one small vent aperture in the container adjacent its base, extruding a length of open-ended thermoplastic tube through a downwardly facing nozzle, stopping said extrusion, cutting said tube at a predetermined distance from the nozzle, which is shorter than the height of the container to be lined but which is not less than about one half the height of the container, by laterally applying to the tube whilst still in at least a semiplastic condition a plurality of cutting tools under substantially symmetrical pressure so as to close the tube at the cut end, withdrawing the cutting tools, placing the container with its opening under the cut length of tube depending from the nozzle, enclosing said length of tube in the container by a relative vertical movement, introducing fluid under pressure into said depending length of tube while the material thereof is still in a semiplastic state to expand the tube into intimate contact with the bottom and side walls of the container, maintaining said pressure while allowing the expanded tube material to set permanently in such intimate contact, and severing the said material from the nozzle.

References Cited in the file of this patent

UNITED STATES PATENTS

| | | |
|---|---|---|
| 667,646 | Bergier | Feb. 5, 1901 |
| 1,474,403 | Chaney | Nov. 20, 1923 |
| 1,537,860 | Miller | May 12, 1925 |
| 1,709,701 | Althoff | Apr. 16, 1929 |
| 1,995,276 | Howard | Mar. 19, 1935 |
| 2,027,961 | Currie | Jan. 14, 1936 |
| 2,177,754 | Tainsh | Oct. 31, 1939 |
| 2,262,612 | Kopitke | Nov. 11, 1941 |
| 2,274,258 | Roselle | Feb. 24, 1942 |
| 2,288,454 | Hobson | June 30, 1942 |
| 2,300,594 | Rehfeld | Nov. 3, 1942 |
| 2,443,053 | Parmelee | June 8, 1948 |
| 2,484,965 | Slaughter | Oct. 18, 1949 |
| 2,562,523 | Brunet | July 31, 1951 |
| 2,632,202 | Haines | Mar. 24, 1953 |
| 2,652,172 | Negola | Sept. 15, 1953 |
| 2,715,751 | Weber | Aug. 23, 1955 |
| 2,721,674 | Lazard | Oct. 25, 1955 |
| 2,750,624 | Coates et al. | June 19, 1956 |

FOREIGN PATENTS

| | | |
|---|---|---|
| 15,868 | Great Britain | A. D. 1890 |